(12) United States Patent
Hussain

(10) Patent No.: US 7,747,670 B2
(45) Date of Patent: Jun. 29, 2010

(54) CUSTOMIZED ITEM COVER

(75) Inventor: Khalid Hussain, Gladstone, MO (US)

(73) Assignee: United States Postal Service

( * ) Notice: Subject to any disclaimer, the term of this patent is extended or adjusted under 35 U.S.C. 154(b) by 707 days.

(21) Appl. No.: 10/245,424

(22) Filed: Sep. 17, 2002

(65) Prior Publication Data

US 2003/0135627 A1    Jul. 17, 2003

Related U.S. Application Data

(60) Provisional application No. 60/322,660, filed on Sep. 17, 2001.

(51) Int. Cl.
G06F 15/16  (2006.01)
(52) U.S. Cl. .................. 709/200; 705/401; 705/408
(58) Field of Classification Search ............. 705/401, 705/408, 410; 709/200
See application file for complete search history.

(56) References Cited

U.S. PATENT DOCUMENTS

| | | | |
|---|---|---|---|
| 3,027,830 A | 4/1962 | Yaeger | |
| 4,083,137 A | 4/1978 | Rozmanith | |
| 4,520,932 A | 6/1985 | Matsuda et al. | |
| 4,641,578 A | 2/1987 | Versaci | |
| 4,783,825 A | 11/1988 | Hirose et al. | |
| 4,873,643 A | 10/1989 | Powell et al. | |
| 4,998,626 A | 3/1991 | Ota | |
| 5,018,207 A | 5/1991 | Purdum | |
| 5,109,153 A | 4/1992 | Johnsen et al. | |
| 5,120,089 A | 6/1992 | Guttag | |
| 5,235,655 A | 8/1993 | Hikawa | |
| 5,308,932 A | 5/1994 | Manduley et al. | |
| 5,319,562 A | 6/1994 | Whitehouse | |
| 5,373,115 A | 12/1994 | Manduley et al. | |
| 5,395,431 A | 3/1995 | Siddiqui et al. | |
| 5,423,573 A | 6/1995 | de Passille | |
| 5,505,132 A | 4/1996 | Warren et al. | |
| 5,612,889 A | 3/1997 | Pintsov et al. | |
| 5,635,694 A | 6/1997 | Tuhro | |
| 5,717,597 A * | 2/1998 | Kara | 705/408 |
| 5,748,484 A | 5/1998 | Cannon et al. | |
| 5,771,289 A | 6/1998 | Kuzma | |
| 5,801,944 A | 9/1998 | Kara | |
| 5,805,710 A | 9/1998 | Higgins et al. | |

(Continued)

FOREIGN PATENT DOCUMENTS

EP    1 022 065    7/2000

(Continued)

OTHER PUBLICATIONS

International Search Report mailed May 28, 2003.

(Continued)

*Primary Examiner*—Yves Dalencourt
(74) *Attorney, Agent, or Firm*—Lewis and Roca LLP

(57) ABSTRACT

Creating a customized item cover comprises receiving customization data and creating at least one customization segment using the customization data. In addition, creating a customized item cover includes producing the customized item cover including the at least one customization segment. Producing the customized item cover may comprise printing the at least one customization segment on the customized item cover or embossing the at least one customization segment on the customized item cover.

75 Claims, 11 Drawing Sheets

U.S. PATENT DOCUMENTS

| | | | |
|---|---|---|---|
| 5,873,605 A | 2/1999 | Kaplan | |
| 5,923,406 A | 7/1999 | Brasington et al. | |
| 5,930,810 A | 7/1999 | Farros et al. | |
| 5,943,432 A | 8/1999 | Gilmore et al. | |
| 5,978,781 A | 11/1999 | Sansone | |
| 5,988,057 A | 11/1999 | Salomon et al. | |
| 6,054,170 A | 4/2000 | Chess et al. | |
| 6,085,182 A | 7/2000 | Cordery | |
| 6,112,193 A | 8/2000 | Dlugos et al. | |
| 6,175,825 B1 | 1/2001 | Fruechtel | |
| 6,176,908 B1 * | 1/2001 | Bauer et al. | 106/31.15 |
| 6,178,411 B1 * | 1/2001 | Reiter | 705/408 |
| 6,199,054 B1 | 3/2001 | Khan et al. | |
| 6,208,980 B1 * | 3/2001 | Kara | 705/408 |
| 6,275,745 B1 | 8/2001 | Critelli et al. | |
| 6,283,362 B1 | 9/2001 | Michlin | |
| 6,295,523 B1 | 9/2001 | Rosenkranz et al. | |
| 6,300,999 B1 | 10/2001 | Komatsu et al. | |
| 6,385,504 B1 | 5/2002 | Pintsov et al. | |
| 6,415,336 B1 | 7/2002 | Sansone | |
| 6,415,983 B1 | 7/2002 | Ulvr et al. | |
| 6,427,139 B1 | 7/2002 | Pierce | |
| 6,459,953 B1 | 10/2002 | Connelly et al. | |
| 6,483,540 B1 | 11/2002 | Akasawa et al. | |
| 6,503,329 B2 | 1/2003 | Patton et al. | |
| 6,507,361 B1 | 1/2003 | Barber | |
| 6,532,452 B1 | 3/2003 | Pintsov et al. | |
| 6,585,433 B2 | 7/2003 | Davies et al. | |
| 6,592,027 B2 | 7/2003 | Kovlakas | |
| 6,594,374 B1 | 7/2003 | Beckstrom et al. | |
| 6,600,823 B1 | 7/2003 | Hayosh | |
| 6,655,579 B1 | 12/2003 | Delman et al. | |
| 6,672,623 B2 | 1/2004 | Patton et al. | |
| 6,676,164 B1 | 1/2004 | Patton et al. | |
| 6,694,874 B1 | 2/2004 | Hussain | |
| 6,741,971 B1 | 5/2004 | Duval et al. | |
| 6,948,867 B2 | 9/2005 | Hussain | |
| 7,343,357 B1 * | 3/2008 | Kara | 705/401 |
| 2001/0032871 A1 * | 10/2001 | Miller et al. | 229/71 |
| 2001/0042052 A1 * | 11/2001 | Leon | 705/401 |
| 2002/0017782 A1 | 2/2002 | Patton et al. | |
| 2002/0017783 A1 | 2/2002 | Patton et al. | |
| 2002/0025085 A1 | 2/2002 | Gustafson et al. | |
| 2002/0089172 A1 | 7/2002 | Patton et al. | |
| 2002/0149195 A1 | 10/2002 | Beasley | |
| 2003/0134627 A1 | 7/2003 | Himmel et al. | |
| 2003/0140017 A1 | 7/2003 | Patton et al. | |
| 2003/0167243 A1 | 9/2003 | Mayes et al. | |
| 2004/0041852 A1 | 3/2004 | Hussain | |
| 2004/0108386 A1 | 6/2004 | Rasti | |
| 2004/0120746 A1 | 6/2004 | Hussain | |
| 2004/0143557 A1 | 7/2004 | Lang et al. | |

FOREIGN PATENT DOCUMENTS

| | | |
|---|---|---|
| WO | WO 91/06915 | 5/1991 |
| WO | WO 93/18925 | 9/1993 |
| WO | WO 00/62527 | 10/2000 |
| WO | WO 01/82587 | 11/2001 |
| WO | 03/024806 A2 | 3/2003 |

OTHER PUBLICATIONS

International Preliminary Examination Report for Application No. PCT/US02/29304 dated Jul. 16, 2003, 2 pages.

* cited by examiner

515

510

505

Rodney Dean
Williams
May 17, 2001

CUSTOMIZED ITEM COVER

RELATED APPLICATION

Under provisions of 35 U.S.C. §119(e), Applicant claims the benefit of U.S. provisional application No. 60/322,660 filed Sep. 17, 2001, which is expressly incorporated herein by reference.

TECHNICAL FIELD

The present invention relates to the field of providing item covers. More particularly, the present invention, in various specific embodiments, involves methods and systems directed to providing customized item covers.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In an effort to lower operating costs and increase value for their customer base, many delivery system operators attempt to create value for their present customers by creating valued-added services. In addition, value-added service can tend to attract new customers as well. Delivery system operator may realize an increase in profitability due to the increased revenue created by value added services. Therefore, there is a need for the United States Postal Service and many other organizations to efficiently provide value added services to their customer base.

One aspect of interest to customers of delivery systems is the appearance of the "covers," that is, the wrapper used to contain an item for-delivery. For example, there is a great interest in "first day covers," attractively printed envelopes bearing a postage stamp with a special cancellation, processed on the first day the stamp is issued.

In an increasingly competitive environment, it is desirable for a deliver system operator to provide an attractive and convenient service allowing users to produce and/or purchase personalized covers.

SUMMARY OF THE INVENTION

In one aspect, a method for creating a customized item cover comprises receiving customization data, creating at least one customization segment using the customization data, and producing the customized item cover including the at least one customization segment.

In another aspect, a system for creating a customized item cover comprises a component for receiving customization data, a component for creating at least one customization segment using the customization data, and a component for producing the customized item cover including the at least one customization segment.

In yet another aspect, a computer-readable medium on which is stored a set of instructions for creating a customized item cover, which when executed perform stages comprising receiving customization data, creating at least one customization segment using the customization data, and producing the customized item cover including the at least one customization segment.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
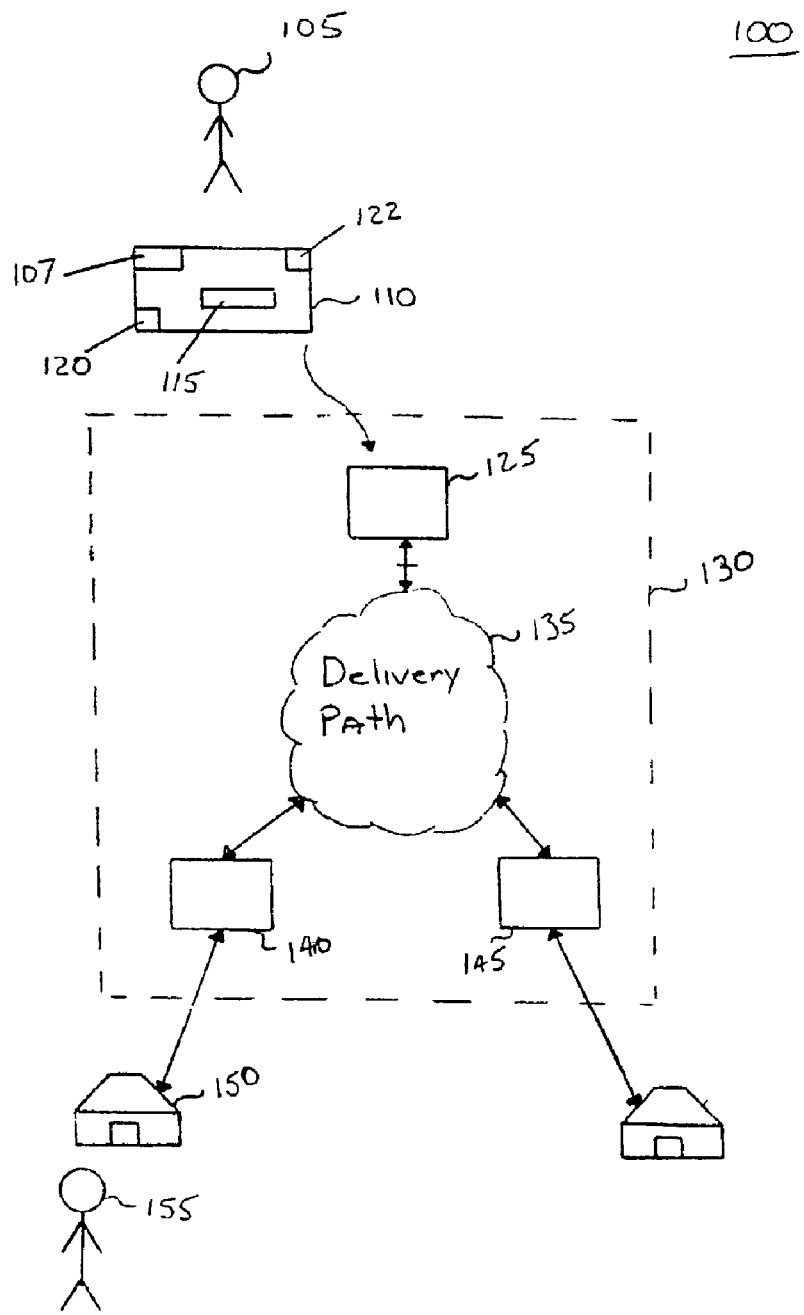
FIG. 1 is a functional block diagram of a system for providing item delivery service consistent with an embodiment of the present invention.

Reference will now be made to various embodiments consistent with this invention, examples of which are shown in the accompanying drawings and will be obvious from the description of the invention. In the drawings, the same reference numbers represent the same or similar elements in the different drawings whenever possible.

FIG. 1 shows an exemplary item delivery system 100 that may be used in conjunction with embodiments of the present invention. Within item delivery system 100, for example, an item 110 may be prepared manually by a user 105 or may be prepared utilizing an inserter under the supervision of user 105. An inserter is an automated device capable of assembling item 110 which may comprise flat mail, catalogs, magazines, mailpieces, United States Postal Service Priority Mail package, or a United States Postal Service Express Mail package. The aforementioned are exemplary and item 110 may comprise many other types of items. In addition, item 110 may include a customized item cover as described below.

In exemplary item delivery system 100, materials may be placed in item 110 that user 105 wishes to send to a recipient 155. With the materials placed in item 110, an address label 115 may be placed on item 110 indicating a first address 150 of a recipient 155 and a return address 107 indicating where to return item 110, if necessary, may be placed on item 110. In addition, a tracking indicia 120 may be placed on item 110 along with a delivery payment coding 122. Tracking indicia 120 may be utilized by a delivery system operator to facilitate the delivery of item 110. The use of tracking indicia 120 will be discussed in greater detail below. Delivery payment coding 122 may indicate the payment amount user 105 believes is required by the delivery system operator to deliver item 110 to recipient 155.

Delivery payment coding 122 may comprise a bar code, an image indicating an account from which delivery payment has been made, a postage stamp, or other types of codings. In addition, item 110 may include at least one customization segment as described below. The aforementioned elements placed on item 110 may be included within one or more customization segments of a customized item cover used in conjunction with item 110 or may be placed upon a customized item cover used in conjunction with item 110.

Tracking indicia 120 may comprise a bar code, a PLANET code (described below), or other types of indicia as are known by those skilled in the art. A bar code is a printed symbol used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, some delivery system operators sorted flat mail using POSTNET, a 12-digit barcode developed by the USPS consisting of alternating long and short bars indicating the destination of, for example, a mailpiece. Responding to the expanding needs of users, particularly heavy volume users, the PLANET code was developed on the foundation of the existing technical infrastructure. The PLANET Code is, in one respect, the opposite of the current POSTNET codes, reversing long bars for short and short bars for long. This innovation offers the convenience of a bar code that may be easily applied using current bar-coding methods, and may be readily scanned by the high-speed automation equipment already located in the plurality of plants comprising a delivery system 130 as discussed below.

In sending item 110, for example, user 105 may place item 110 into a delivery system 130 at a sender plant 125. Item 110 may be routed through delivery system 130 comprising sender plant 125, a delivery path 135, a first address plant 140, and a second address plant 145. Delivery path 135 may comprise a plurality of plants similar to sender plant 125, first address plant 140, and second address plant 145. The plants within delivery system 130 may contain, among other things, automated systems and sorting equipment and may be designed to receive and process a plurality of items. Delivery system 130 may be configured to sense tracking indicia 120 that may be placed on item 110 as it passes through the elements of delivery system 130 directing the movement of item 110 through delivery system 130. Tracking indicia 120 sensed by delivery system 130 may comprise a bar code, a PLANET code, or other indicia as described herein above.

In the delivery process, item 110 may be routed to the next most appropriate plant in delivery system 130. The appropriateness of the next plant in delivery system 130 may depend upon the present location of the particular item in delivery system 130 and where item 110 is addressed. Ultimately, item 110 may be routed in delivery system 130 to the plant that serves the delivery address indicated on item 110, according to established procedures. Thus, item 110 may be routed from plant to plant within delivery system 130 wherein item 110 may efficiently converges on the plant that serves the delivery address that may be indicated on the item, in this case, first address plant 140. Throughout this process, delivery system may 130 track the progress of items 110 through delivery system 130.

Consistent with the general principles of the present invention, a system for creating a customized item cover may comprise a component for receiving customization data, a component for creating at least one customization segment using the customization data, and a component for producing the customized item cover including the at least one customization segment.

Figure 2:
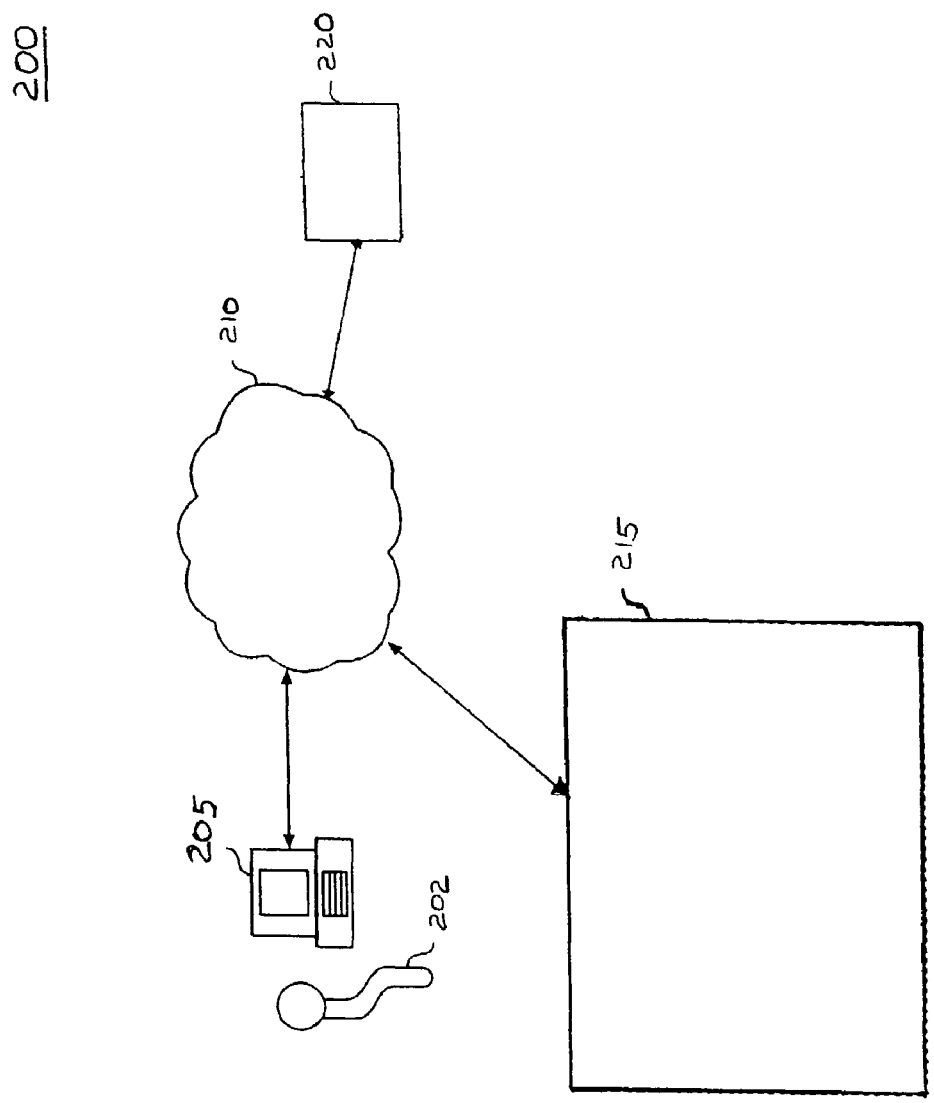
FIG. 2 is a functional block diagram of a system for creating customized item covers consistent with an embodiment of the present invention.

As herein embodied and illustrated in FIG. 2, a system for creating a customized item cover 200 may comprise a user computer 205, a network 210, a delivery system server 215, and a licensee server 220. In the exemplary embodiment of FIG. 2, for example, any of the component for receiving customization data, the component for creating at least one customization segment, and the component for producing the customized item cover may be embodied in the user computer 205, the delivery system server 215, the licensee server 220, or any combination thereof.

User computer 205 may comprise a personal computer or other similar microcomputer-based workstation. However, user computer 205 may comprise any type of computer operating environment such as hand-held devices, multiprocessor systems, microprocessor-based or programmable consumer electronics, minicomputers, mainframe computers, and the like. User computer 205 may also be practiced in distributed computing environments where tasks are performed by remote processing devices. Furthermore, user computer 205 may comprise a mobile terminal such as a smart phone, personal digital assistant (PDA), intelligent pager, portable computer, or a hand held computer. A PDA is a handheld computer that may serve as an organizer for personal information. It generally includes at least a name and address database, to-do list and note taker. PDAs are typically pen-based and use a stylus ("pen") to tap selections on menus and to enter printed characters. The unit may also include a small on-screen keyboard which is tapped with the pen. Data may be synchronized between the PDA and a desktop computer through a cable or wireless transmissions.

User computer 205 may be located in a home, office, store, a delivery system operator office such as the United States Postal Service Post Office, a location of a licensee of a delivery system operator, a retail center kiosk, or any location wherein it may be operated. Moreover, user computer 205 may be operated by a user 202 that may comprise a subject, a technician, or any other person or advisor. The aforementioned users and locations are exemplary and user computer 205 may be located at a variety of places and operated by a variety of people.

Network 210 may comprise, for example, a local area network (LAN) or a wide area network (WAN). Such networking environments are commonplace in offices, enterprise-wide computer networks, intranets, and the Internet and are known by those skilled in the art. When a LAN is used as network 210, user computer 205 and elements of delivery system server 215 may be connected to network 210 through a network interface located at each of the respective user computer 205 and elements of delivery system server 215. When a WAN networking environment is utilized as network 210, user computer 205 and elements of delivery system server 215 may typically include an internal or external modem (not shown) or other means for establishing communications over the WAN, such as the Internet.

In addition to utilizing a wire line communications system as network 210, a wireless communications system, or a combination of wire line and wireless may be utilized as network 210 in order to, for example, exchange web pages via the internet, exchange e-mails via the Internet, or for utilizing other communications media. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. User computer 205 and elements of delivery system server 215 in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding voice transmission.

In utilizing network 210, data sent over network 210 may be encrypted to insure data security. When encrypting, the data may be converted into a secret code for transmission over a public network. The original file, or "plaintext," may be converted into a coded equivalent called "ciphertext" via an encryption algorithm executed, for example, on user computer 205 or on elements of delivery system server 215. The ciphertext is decoded (decrypted) at a receiving end and turned back into plaintext.

The encryption algorithm may use a key, which is a binary number that is typically from 40 to 128 bits in length. The greater the number of bits in the key (cipher strength), the more possible key combinations and the longer it would take to break the code. The data is encrypted, or "locked," by combining the bits in the key mathematically with the data bits. At the receiving end, the key is used to "unlock" the code and restore the original data.

There are two main cryptographic methods that may be suitable for use with system 200. The traditional method uses a secret key, such as the Data Encryption Standard (DES). In DES, both sender and receiver use the same key to encrypt and decrypt. This is the fastest method, but transmitting the secret key to the recipient in the first place is not secure. The second method is public-key cryptography, such as the Rivest-Shamir-Adleman (RSA) highly-secure cryptography method by RSA Data Security, Inc., Redwood City, Calif. RSA uses a two-part concept with both a private and a public key. The private key is kept by the owner; the public key is published. Each recipient has a private key that is kept secret and a public key that is published for everyone. The sender looks up the recipient's public key and uses it to encrypt the message. The recipient uses the private key to decrypt the message. Owners never have a need to transmit their private keys to anyone in order to have their messages decrypted, thus the private keys are not in transit and are not vulnerable.

Public key cryptography software marketed under the name Pretty Good Privacy (PGP) from Pretty Good Privacy, Inc., (PGP) of San Mateo, Calif., may be utilized in this embodiment. PGP was developed by Phil Zimmermann, founder of the company, and it is based on the RSA cryptographic method. A version for personal, non-business use is available on various Internet hosts. While PGP may be used to encrypt data transmitted over network 210, many other types of encryption algorithms, methods, or schemes may be employed.

In system 200, data may be transmitted or received by methods and processes other than, or in combination with network 210. These methods and processes may include, but are not limited to, transferring data via, diskette, CD ROM, facsimile, conventional mail, an interactive voice response system (IVR), or via voice over a publicly switched telephone network. An IVR is an automated telephone answering system that responds with a voice menu and allows the user to make choices and enter information via the telephone keypad. IVR systems are widely used in call centers as well as a replacement for human switchboard operators. An IVR system may also integrate database access and fax response.

Figure 3:
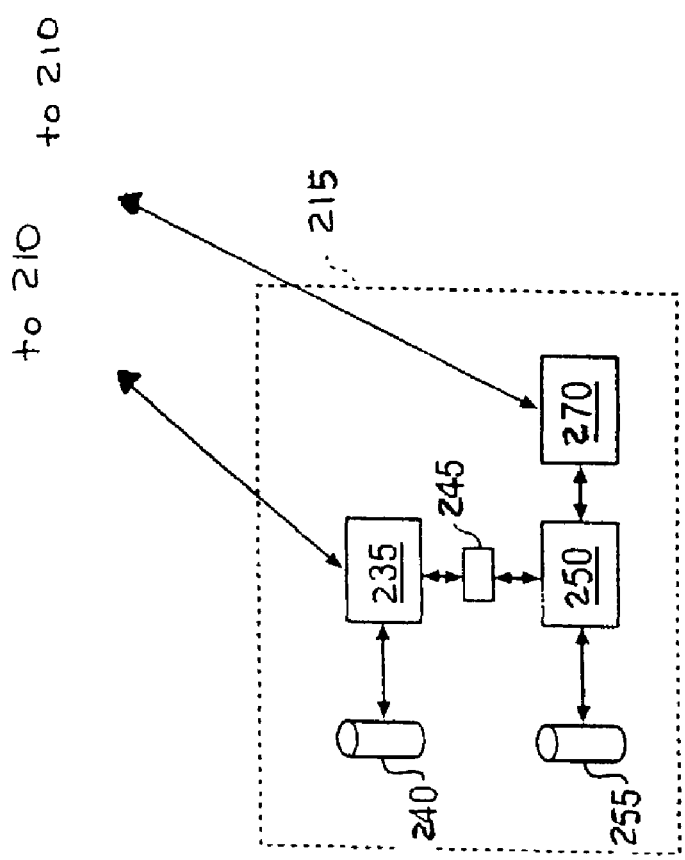
FIG. 3 is a functional block diagram of a delivery system server consistent with an embodiment of the present invention.

Referring to FIG. 3, delivery system server 215 comprises a first server front end 235 with its associated first server front end database 240, a first server back end 250 with its associated first server back end database 255, and a simple mail transfer protocol (SMTP) server 270. First server front end 235 is separated from first server back end 250 by a first server firewall 245. One function of first server front end 235 is to provide an interface via network 210 between user computer 205 and delivery system server 215. The function of the SMTP server 270 is to provide, for example, an e-mail interface via network 210 between user computer 205 and first server 215.

Simple Mail Transfer Protocol is a standard e-mail protocol on the Internet. It is a TCP/IP protocol that defines the message format and the message transfer agent (MTA), which stores and forwards the mail. SMTP was originally designed for only ASCII text, but MIME and other encoding methods enable program and multimedia files to be attached to e-mail messages. SMTP servers route SMTP messages throughout the Internet to a mail server, such as a Post Office Protocol 3 (POP3) or an Internet Messaging Access Protocol (IMAP) server, which provides a message store for incoming mail.

Post Office Protocol 3 (POP3) servers, using the SMTP messaging protocol, are standard mail servers commonly used on the Internet. POP3 servers provide a message store that holds incoming e-mail until users log on and download them. With POP3, all pending messages and attachments are downloaded at the same time. Internet Messaging Access Protocol (IMAP) is also a standard mail server that is widely used on the Internet. It provides a message store that holds incoming e-mail until users log on and download them. IMAP, however, is more sophisticated than the POP3 mail server. In IMAP, messages can be archived in folders, mailboxes can be shared, and a user can access multiple mail servers. There is also better integration with MIME, which is used to attach files. For example, users can read only the headers in the message without having to automatically accept and wait for unwanted attached files to download.

First server front end 235 and first server back end 250 may comprise a personal computer or other similar microcomputer-based workstations. However, first server front end 235 and first server back end 250 may comprise other types of computer operating environment such as hand-held devices, multiprocessor systems, microprocessor-based or programmable consumer electronics, minicomputers, mainframe computers, and the like. First server front end 235 and first server back end 250 may also be practiced in distributed computing environments where tasks are performed by remote processing devices. First server front end 235 is preferably implemented on a Compaq Proliant 1600 server running Windows 2000 and Domino Webserver. First server back end 250 is preferably implemented on a Compaq Proliant 1600 server running NT4 and Domino Application Server. And SMTP server 270 is preferably implemented on a Compaq DL 360 running Windows 2000 and Domino SMTP Mail Server.

Other servers, such as a licensee server 220 (FIG. 2), may be included in system 200. Other servers used in system 200 may be constructed in an architecture similar to delivery system server 215 or may be constructed using other suitable architectures.

Figure 4:
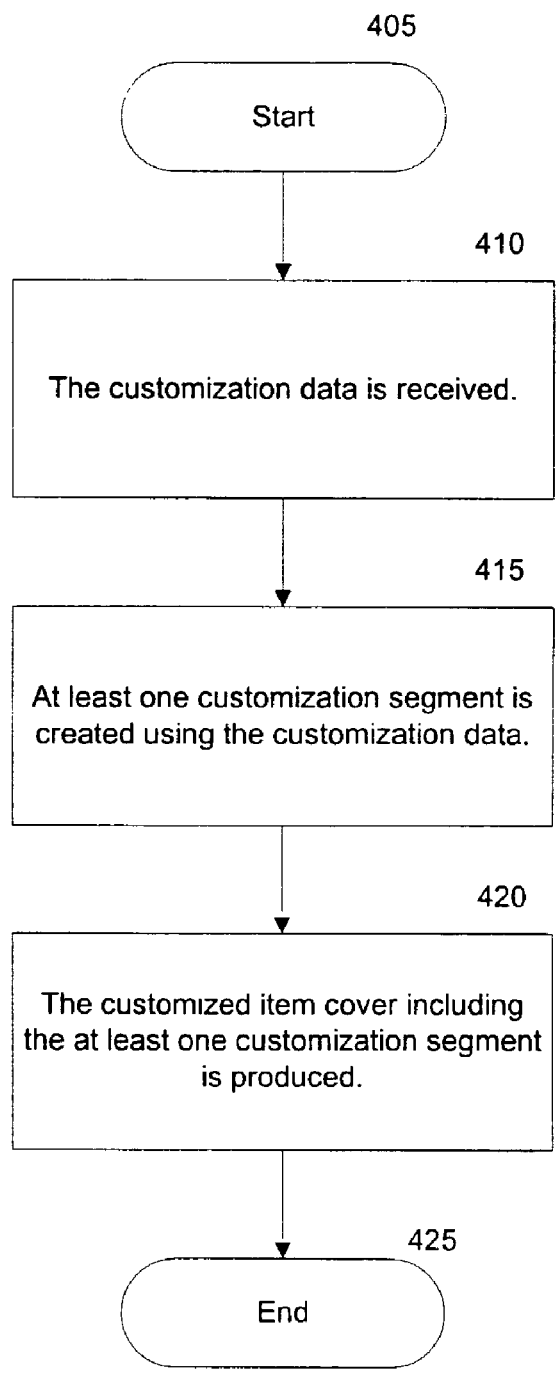
FIG. 4 is a flow chart of an exemplary method for creating customized item covers consistent with an embodiment of the present invention.

FIG. 4 is a flow chart setting forth the general stages involved in an exemplary method 400 for creating a customized item cover. Exemplary method 400 begins at starting block 405 and proceeds to stage 410 where customization data is received. For example, the customization data may comprise a scanned image, a drawing, text data, or a photograph and may be transmitted or received over system 200 as described above. The aforementioned types of customization data and the system for sending and receiving it are exemplary and many other types of data or systems may be employed.

In order to receive the customization data, the delivery system operator may make available software to users that may enable delivery system users to select images that will appear on the customized item covers. User 202, for example, can either select an image from a group of pre-designed and pre-approved images or may create and impute any design and have the design applied to the customized item covers. User 202 may modify pre-designed images by superimposing a user-supplied image on top of a pre-designed image. If user 202 wishes to use a customized item covers with a user-supplied image, the user may have the design approved by the delivery system operator before it is produced.

Customization data for use with a customized item covers may be adapted for use in many different applications or commemorate a multitude of events. It can be used for regular household use, special occasions, special events, tourist attractions, wedding announcements, family pictures, corporation logos, philatelic organizations, a birthday, a birth, a sporting event, an inauguration, a new product promotion, an advertisement, a retirement, a graduation, or other promotional uses. For example, sports teams may want to use their team logos on customized item covers for promotion letters, ticket sending, and all kinds of communication or advertising. The aforementioned uses are exemplary and many other types of events, occasions, or uses may be employed.

From stage 410 where customization data is received, exemplary method 400 advances to stage 415 where at least one customization segment is created using the customization data. For example, the customization segment may include a personalized delivery payment coding customized with the different applications or commemorating any one or more of the multitude of events as described above. In addition, the personalized delivery payment coding may be canceled with a cancellation marking commemorating any one or more of the different applications or events as described above. Again, the aforementioned uses are exemplary and many other types of events, occasions, or uses may be employed.

Figure 5:
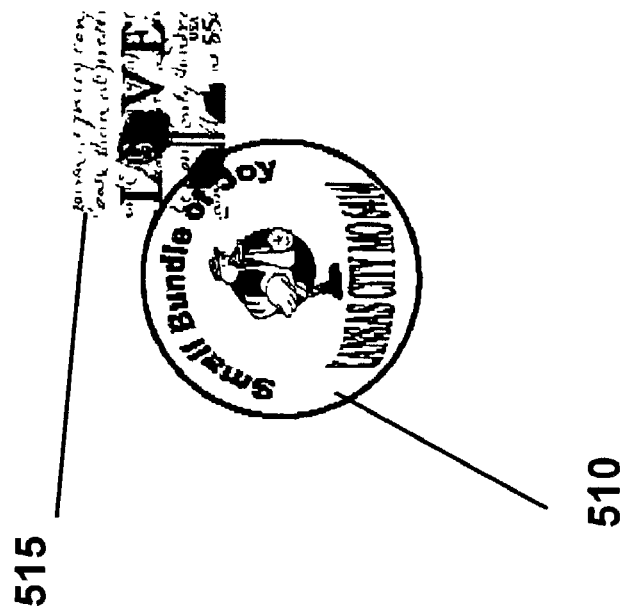
FIG. 5 is an illustration of a customization segment consistent with an embodiment of the present invention.
Figure 5:
Figure 6:
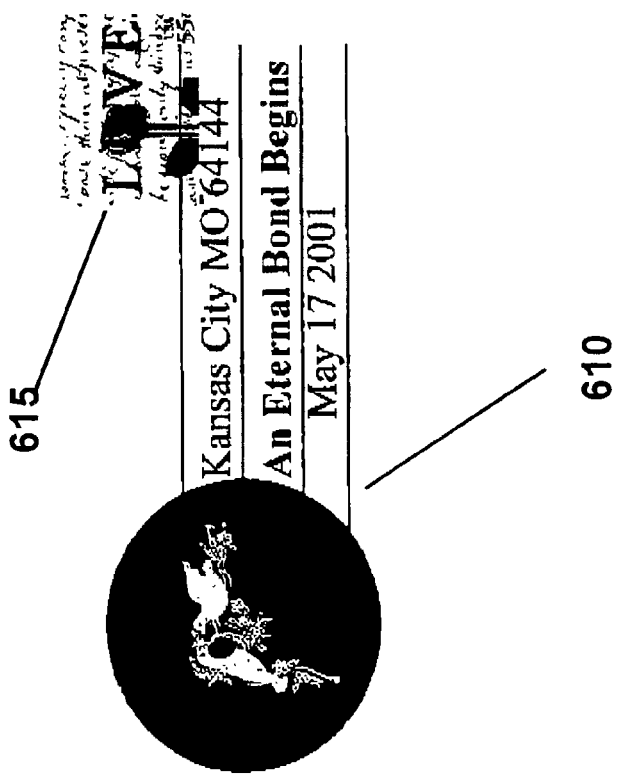
FIG. 6 is an illustration of a customization segment consistent with an embodiment of the present invention.
Figure 6:
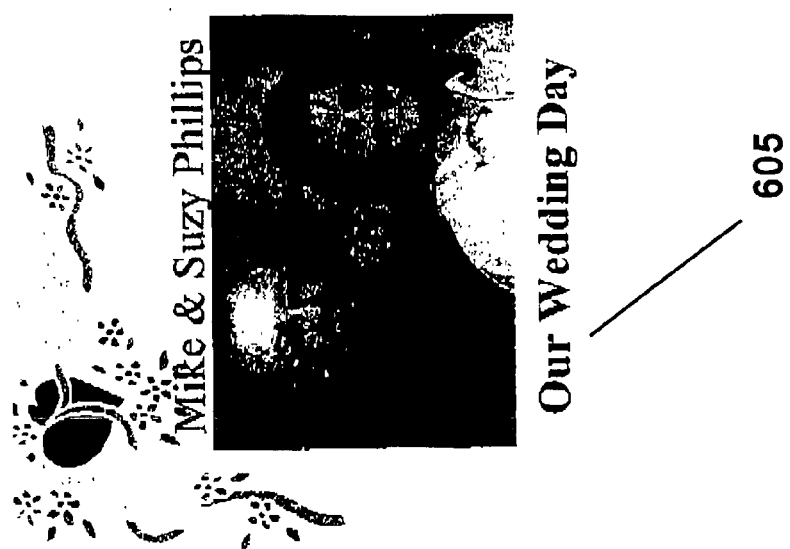
Figure 7:
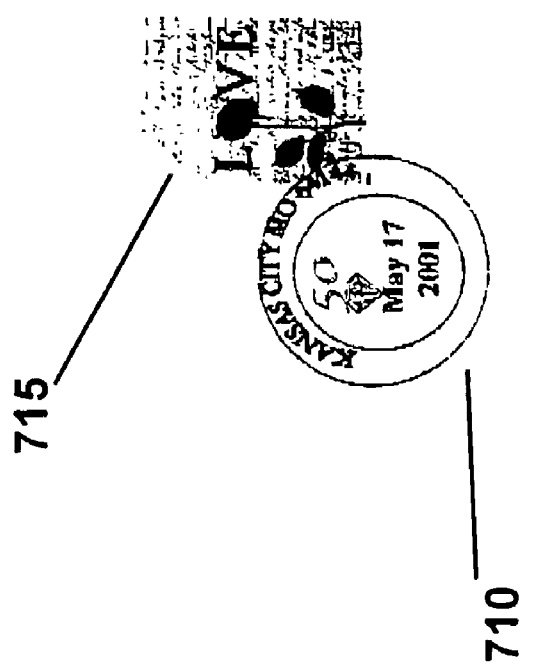
FIG. 7 is an illustration of a customization segment consistent with an embodiment of the present invention.
Figure 7:
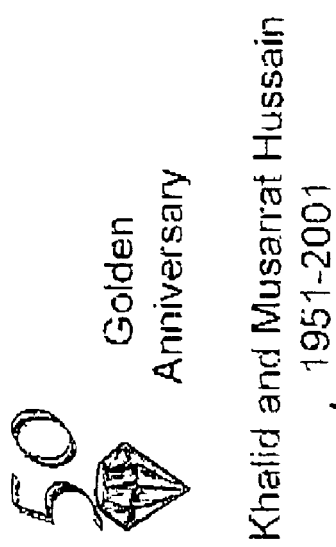

FIG. 5 through FIG. 7 illustrate examples of customization segments including personalized delivery payment codings and cancellation markings. Specifically, FIG. 5 includes a first area 505 and a cancellation marking 510 commemorating a birth, and a delivery payment coding 515 that may or may not commemorate the same event. In this FIG., two customization segments 505, 510 are linked together commemorating a birth. Similarly, FIG. 6 includes a first area 605 and a cancellation marking 610 commemorating a wedding, and a delivery payment coding 615 that may or may not commemorate the same event. In this FIG., two customization segments 605, 610 are linked together commemorating a marriage, with the date of the marriage is utilized as part of the cancellation marking 610. FIG. 7 includes a first area 705 and a cancellation marking 710 commemorating a wedding anniversary, and a delivery payment coding 715 that may or may not commemorate the same event. In this FIG., two customization segments 705, 710 are linked together commemorating a wedding anniversary, with the date of the anniversary is utilized as part of the cancellation marking 710.

In addition to personalized images, users may wish to include on the personalized delivery payment coding the delivery rate desired. For example, in the case where the personalized delivery payment coding is analogous to a postage stamp, user 202 may wish to include postal card rate, first class rate, express mail, priority mail, or international mail, on the personalized delivery payment coding.

System 200 may contain defined pre-designed images, and may be capable of maintenance to add additional images, reflect increased costs, and delivery rate changes. Because the delivery system operator may develop additional images, the user may have an increasingly better selection of choices.

Once the at least one customization segment is created using the customization data in stage 415, exemplary method 400 advances to stage 420 where the customized item cover including the at least one customization segment is produced. For example, the at least one customization segment may be printed or embossed in color upon an item cover comprising a woven fabric, a non-woven fabric, a plastic material, a foil material, or a metal material. The aforementioned production techniques and materials are exemplary and other techniques or material my be employed.

The item covers (or base stock) used for producing the customized item covers may be supplied by the delivery system operator because the covers may need to be processed by, for example, processing equipment operated by the delivery system operator and be resistant to forgery. This may be especially true when a personalized delivery payment coding is used in conjunction with the customized item cover. For example, stock comprising a standard sized envelope may be used that may work in conjunction with a standard conventional personal computer desktop printer paper. A portion of this exemplary envelope may include an area for a personalized delivery payment coding.

High-speed item processing or sorting equipment may use phosphor as a luminous tagging device to detect a delivery payment coding. The stock used for the customized item covers, specifically, in a designated area for the personalized delivery payment coding may be pre-phosphor paper comprising approximately 200 pmu, +/−10 pmu. If the phosphor is on the stock before producing the customized item cover, the stock could be used as delivery payment coding without any printing on it, and high-speed item processing or sorting equipment may detect it as postage.

As additional security against counterfeiting, the stock used for producing the customized item covers may be imbedded with security threads or tape strips similar to the strips used in paper currency with the words, for example, "USPS," "e-postage," or "USPS e-post" or the like continuously printed on a tape or thread. As a further security measure, the customized item cover may have a continuous line of microprint of words, for example, "USPS e-post" or the like at locations on the stock. The microprints appear just like a line, but through a microscope, the printing can be seen.

By having the microprinting on the customized item covers, a two-stage control may be in place to protect against forgery. The system 200 may print the microprinting on the stock and the threads may be pre-imbedded into the stock. Without both features, the customized item cover may not be deemed legitimate by the delivery system operator.

The printing capability of printers used to print the customized item covers, for example, may be up to 600 dots per inch ("dpi") or may have a Parker value 1.0 to 2.0. "Parker value" is a technical term referring to the smoothness of the paper. 600 dpi may require much higher resolution from a printer in order to achieve success. Otherwise, poor printing may result and the customized item covers may lose its integrity.

A facility or licensee where the customized item covers may be processed and finished may have equipment to process and use photo and/or design images and to print by electronic device with high quality outputs. The process and the printing capability may be about 400 lpi (lines per inch) for clear microprints layout on each customized item cover produced. From stage 420 where the customized item cover including the at least one customization segment is produced, exemplary method 400 ends at stage 425.

Figure 8:
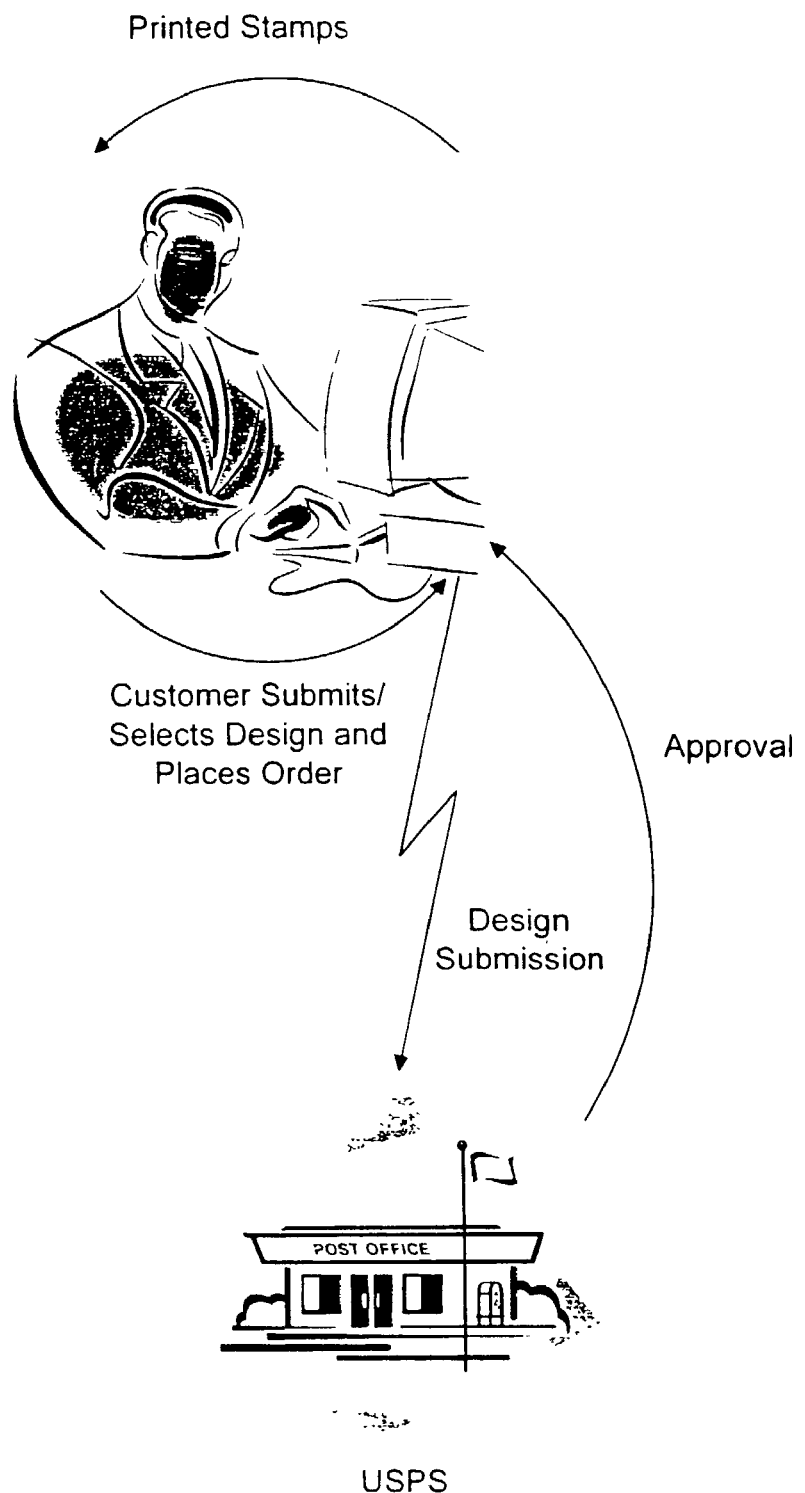
FIG. 8 is an illustration of a first exemplary embodiment consistent with an embodiment of the present invention.

As shown in FIGS. 8 through 11, a user, for example, a USPS customer, may have the ability to obtain a customized item cover from a delivery system operator, for example, the USPS, in several ways depending on different embodiments of the invention. In one embodiment, as shown in FIG. 8, the customer (user 202 for example) may electronically access (through network 215 for example) the USPS (at delivery system server 215 for example). This may be accomplished by programming modules on user computer 205. The customer may select, for example, the rate of postage and a pre-approved design or submit a design for approval on the customer's own personal computer such as user computer 205. The USPS can approve the design and electronically notify the customer of the approval. After approval, the customer may print the customized item covers with the design with a printer associated with user computer 205.

Figure 9:
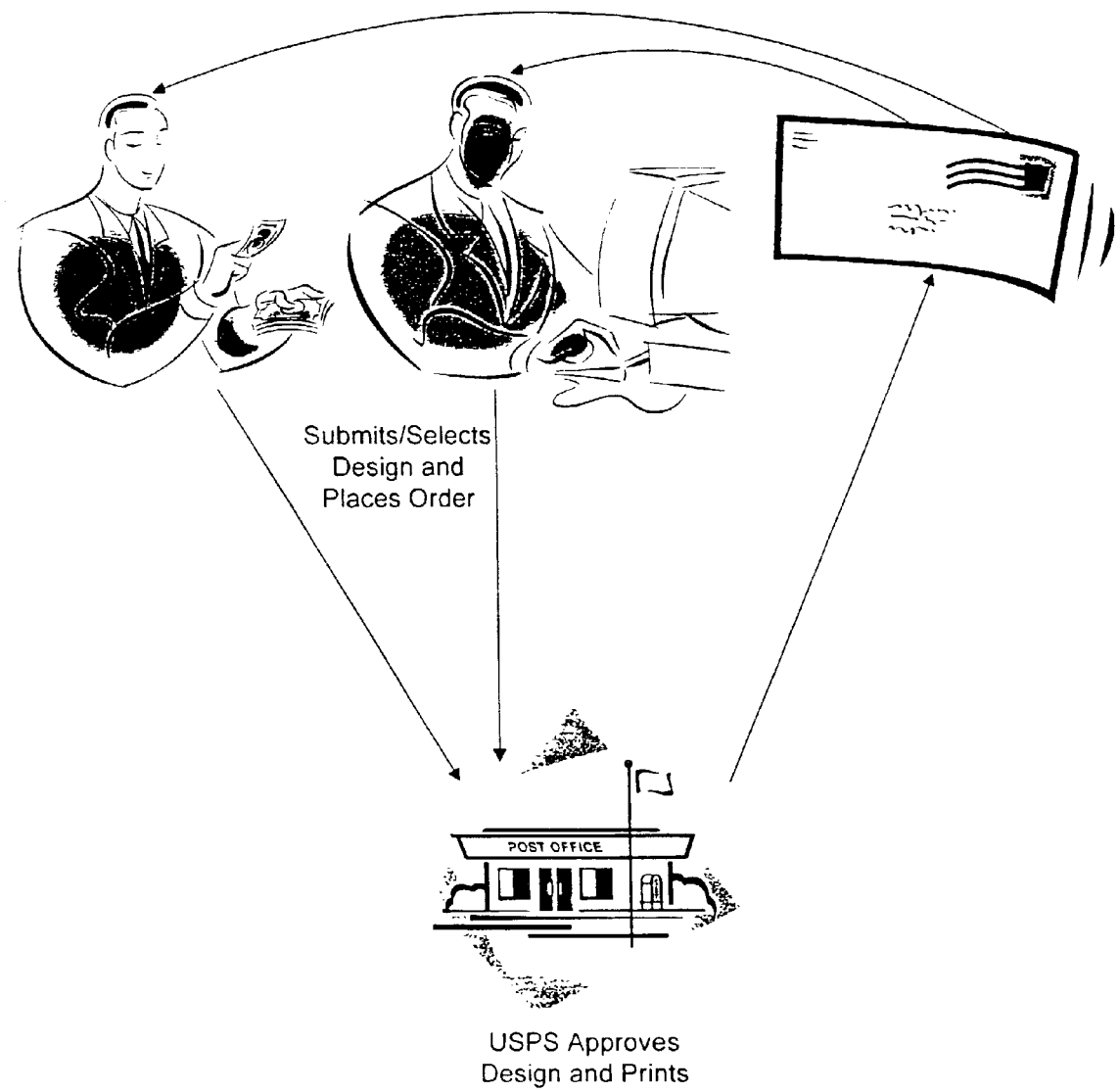
FIG. 9 is an illustration of a second exemplary embodiment consistent with an embodiment of the present invention.

In another embodiment, shown in FIG. 9, the delivery system operator (the USPS, for example) may operate through a centralized location. For example, a customer can send his or her photo, electronic file, or image to the USPS for approval, or simply notify the USPS which pre-approved design the customer wishes to have on the customized item covers. The customer may order a quantity of the customized item covers and may include postal class or rate the customer wishes if a personalized delivery payment coding is employed. The USPS can produce the customized item covers and send them to the customer.

Figure 10:
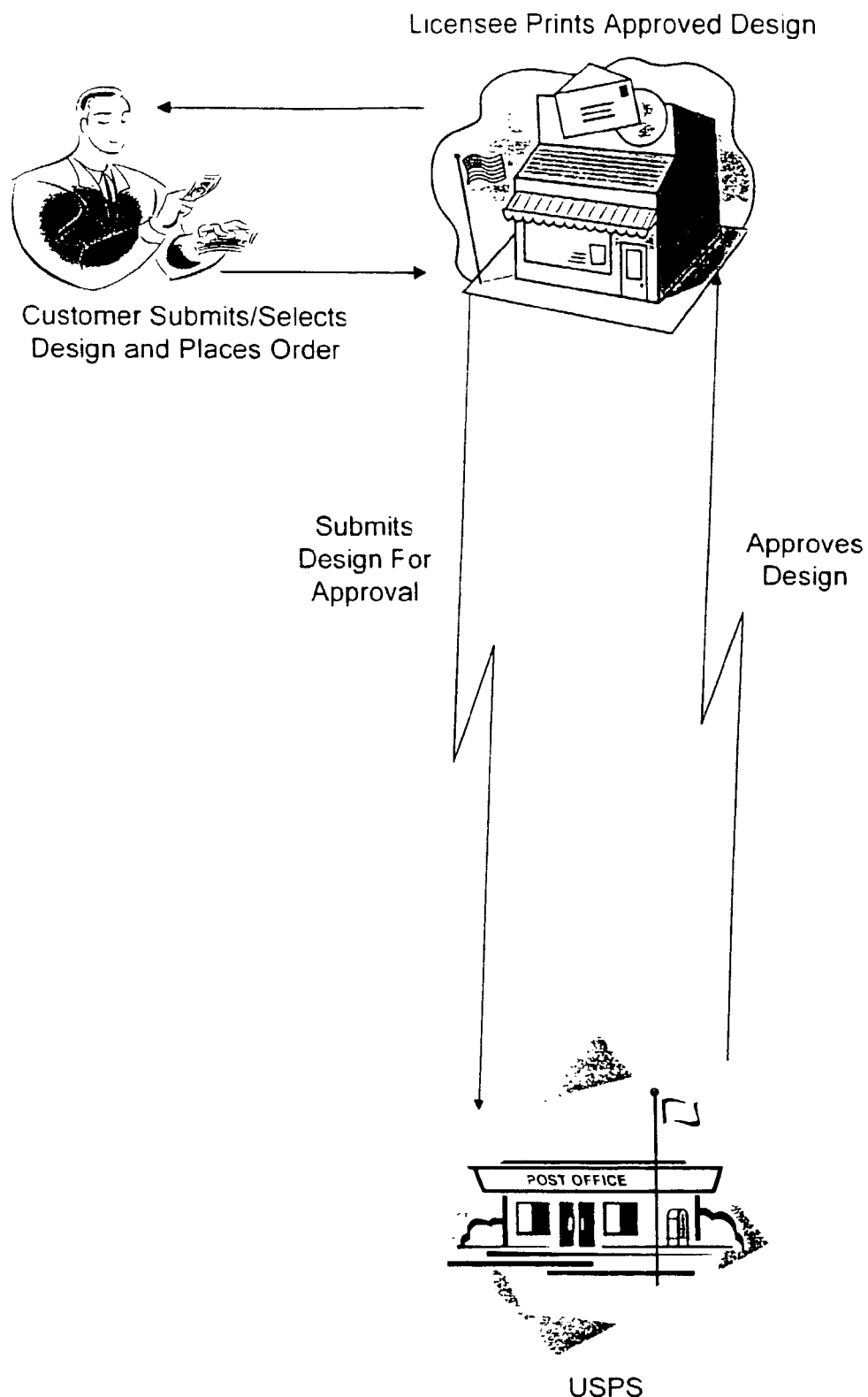
FIG. 10 is an illustration of a third exemplary embodiment consistent with an embodiment of the present invention.
Figure 11:
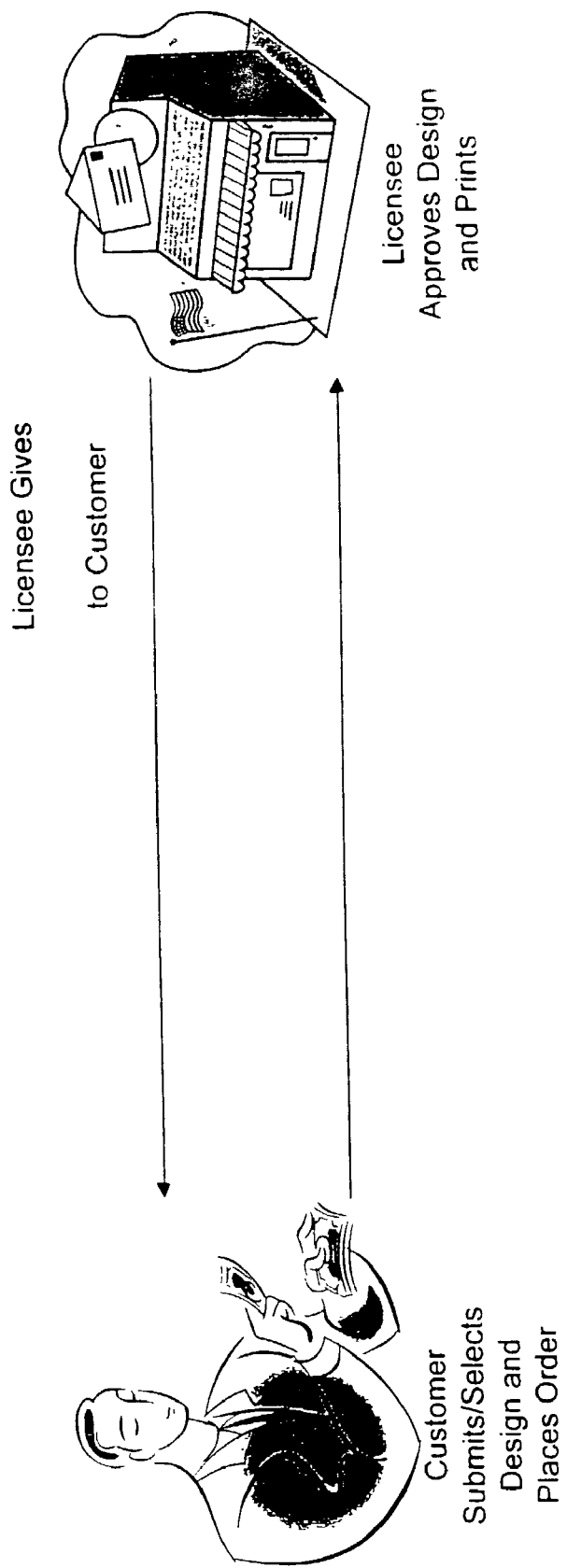
FIG. 11 is an illustration of a third exemplary embodiment consistent with an embodiment of the present invention.

In another embodiment, shown in FIGS. 10 and 11, the delivery system operator (the USPS, for example) may license the software to organizations or companies to provide to customers a local outlet to obtain a customized item cover. The licensees may have access to software and printing equipment to print a customized item cover. The customer may order the customized item cover from the licensee and the licensee may submit the personal designs to the USPS, as shown in FIG. 10, or will themselves approve or disapprove the custom design in accordance to USPS guidelines and regulations, as shown in FIG. 11. Once a design is properly approved, the licensee may print the customized item cover for the customer.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method for creating on a computer a customized item cover having multiple customization segments, the method comprising:

receiving customization data;

creating a first customization segment using the customization data, the first customization segment associated with a second customization segment on the customized item cover a portion of the first customization segment printed at a location on the second customization segment, wherein at least one of the first and second customization segments includes a personalized delivery payment coding and commemorates an event that comprises at least one of a birthday, a birth, a wedding, a sporting event, an inauguration, a new product promotion, an advertisement, a retirement, and a graduation, and wherein the personalized delivery payment coding comprises at least one of a denomination of delivery payment indicated on the personalized delivery payment coding, a delivery payment rate class indicated on the personalized delivery payment coding, and a bar coding; and producing the customized item cover including the first and second customization segments.

2. The method of claim 1, wherein the first customization segment comprises a design selected from at least one of a set of pre-approved designs and a set of designs submitted by a user and approved by a delivery system operator.

3. The method of claim 1, wherein a user submits a cover request on a user computer, wherein the user computer and a delivery system operator communicate over a network.

4. The method of claim 1, wherein a user orders the customized item cover from a delivery system operator, and the delivery system operator produces the customized item cover and sends the customized item cover to the user.

5. The method of claim 1, wherein a user orders the customized item cover from a licensee of a delivery system operator, and the licensee produces the customized item cover.

6. The method of claim 5, wherein the licensee communicates with the delivery system operator over a network.

7. The method of claim 1, wherein the personalized delivery payment coding is canceled with a cancellation marking commemorating an event.

8. The method of claim 7, wherein the event comprises at least one of a birthday, a birth, a wedding, a sporting event, an inauguration, a new product promotion, an advertisement, a retirement, and a graduation.

9. The method of claim 1, wherein the delivery payment coding includes a control marking.

10. The method of claim 9, wherein the control marking comprises a serial number.

11. The method of claim 1, wherein the personalized delivery payment coding comprises machine-readable marking.

12. The method of claim 11, wherein the machine-readable marking comprises phosphor.

13. The method of claim 1, wherein the personalized delivery payment coding includes microprinted text within the personalized delivery payment coding.

14. The method of claim 1, wherein the delivery payment coding includes a security thread.

15. The method of claim 1, wherein the customized item cover comprises at least one of an envelope, a card, a package, a United States Postal Service Priority Mail service package, and a United States Postal Service Express Mail service package.

16. The method of claim 1, wherein the customized item cover is produced on stock comprising at least one of a woven fabric, a non-woven fabric, a plastic material, a foil material, and a metal material.

17. The method of claim 1, wherein the customization data comprises at least one of a scanned image, a drawing, text data, and a photograph.

18. The method of claim 1, wherein the customization data comprises at least one of a scanned image, a drawing, text data, and a photograph separate from a delivery payment coding.

19. The method of claim 1, wherein the customized item cover commemorates an event.

20. The method of claim 19, wherein the event comprises at least one of a birthday, a birth, a wedding, a sporting event, an inauguration, a new product promotion, an advertisement, a retirement, and a graduation.

21. The method of claim 1, wherein the first customization segment includes color.

22. The method of claim 1, wherein producing the customized item cover comprises at least one of printing the first customization segment on the customized item cover and embossing the first customization segment on the customized item cover.

23. The method of claim 1, wherein the first and second customization segments are selected from a group consisting of: a customized delivery payment coding, a customized cancellation marking, and a customized area on the item cover different from a delivery payment coding and a cancellation marking.

24. The method of claim 1 wherein the first customization segment is associated with the second customization segment through commemorating an event.

25. The method of claim 24 wherein the event is at least one of a set consisting of: a birth, a birthday, a wedding, a wedding anniversary, a sporting event, an inauguration, a new product promotion, an advertisement, a retirement, and a graduation.

26. A system for creating on a computer a customized item cover having multiple customization segments, the system comprising:

a component for receiving customization data;

a component for creating a first customization segment using the customization data, the first customization segment associated with a second customization segment on the customized item cover, a portion of the first customization segment printed at a location on the second customization segment wherein at least one of the first and second customization segments includes a personalized delivery payment coding and commemorates an event that comprises at least one of a birthday, a birth, a wedding, a sporting event, an inauguration, a new product promotion, an advertisement, a retirement, and a graduation, and wherein the personalized delivery payment coding comprises at least one of a denomination of delivery payment indicated on the personalized delivery payment coding, a delivery payment rate class indicated on the personalized delivery payment coding, and a bar coding; and a component for producing the customized item cover including the first and second customization segments.

27. The system of claim 26, wherein the first customization segment comprises a design selected from at least one of a set of pre-approved designs and a set of designs submitted by a user and approved by a delivery system operator.

28. The system of claim 26, wherein a user submits a cover request on a user computer, and wherein the user computer and a delivery system operator communicate over a network.

29. The system of claim 26, wherein a user orders the customized item cover from a delivery system operator, the delivery system operator produces the customized item cover and sends the customized item cover to the user.

30. The system of claim 26, wherein a user orders the customized item cover from a licensee of a delivery system operator, and the licensee produces the customized item cover.

31. The system of claim 30, wherein the licensee communicates with the delivery system operator over a network.

32. The system of claim 26, wherein the personalized delivery payment coding is canceled with a cancellation marking commemorating an event.

33. The system of claim 32, wherein the event comprises at least one of a birthday, a birth, a wedding, a sporting event, an inauguration, a new product promotion, an advertisement, a retirement, and a graduation.

34. The system of claim 26, wherein the delivery payment coding includes a control marking.

35. The system of claim 34, wherein the control marking comprises a serial number.

36. The system of claim 26, wherein the personalized delivery payment coding comprises machine-readable marking.

37. The system of claim 36, wherein the machine-readable marking comprises phosphor.

38. The system of claim 26, wherein the personalized delivery payment coding includes microprinted text within the personalized delivery payment coding.

39. The system of claim 26, wherein the delivery payment coding includes a security thread.

40. The system of claim 26, wherein the customized item cover comprises at least one of an envelope, a card, a package, a United States Postal Service Priority Mail service package, and a United States Postal Service Express Mail service package.

41. The system of claim 26, wherein the customized item cover is produced on stock comprising at least one of a woven fabric, a non-woven fabric, a plastic material, a foil material, and a metal material.

42. The system of claim 26, wherein the customization data comprises at least one of a scanned image, a drawing, text data, and a photograph.

43. The system of claim 26, wherein the customization data comprises at least one of a scanned image, a drawing, text data, and a photograph separate from a delivery payment coding.

44. The system of claim 26, wherein the customized item cover commemorates an event.

45. The system of claim 44, wherein the event comprises at least one of a birthday, a birth, a wedding, a sporting event, an inauguration, a new product promotion, an advertisement, a retirement, and a graduation.

46. The system of claim 26, wherein the first customization segment includes color.

47. The system of claim 26, wherein the component for producing the customized item cover is further configured for at least one of printing the first customization segment on the customized item cover and embossing the first customization segment on the customized item cover.

48. The system of claim 26, wherein the first and second customization segments are selected from a group consisting of: a customized delivery payment coding, a customized cancellation marking, and a customized area on the item cover different from a delivery payment coding and a cancellation marking.

49. The system of claim 26, wherein the first customization segment is associated with the second customization segment through commemorating an event.

50. The system of claim 49 wherein the event is at least one of a set consisting of: a birth, a birthday, a wedding, a wedding anniversary, a sporting event, an inauguration, a new product promotion, an advertisement, a retirement, and a graduation.

51. A computer-readable medium on which is stored a set of instructions for creating a customized item cover having multiple customization segments, which when executed by a processor, perform stages comprising:
   receiving customization data;
   creating a first customization segment using the customization data, the first customization segment associated with a second customization segment on the customized item cover, a portion of the first customization segment printed at a location on the second customization segment wherein at least one of the first and second customization segments includes a personalized delivery payment coding and commemorates an event that comprises at least one of a birthday, a birth, a wedding, a sporting event, an inauguration, a new product promotion, an advertisement, a retirement, and a graduation, and wherein the personalized delivery payment coding comprises at least one of a denomination of delivery payment indicated on the personalized delivery payment coding, a delivery payment rate class indicated on the personalized delivery payment coding, and a bar coding; and
   producing the customized item cover including the first and second customization segments.

52. The computer-readable medium of claim 51, wherein the first customization segment comprises a design selected from at least one of a set of pre-approved designs and a set of designs submitted by a user and approved by a delivery system operator.

53. The computer-readable medium of claim 51, wherein a user submits a cover request on a user computer, and wherein the user computer and a delivery system operator communicate over a network.

54. The computer-readable medium of claim 51, wherein a user orders the customized item cover from a delivery system operator, and the delivery system operator produces the customized item cover and sends the customized item cover to the user.

55. The computer-readable medium of claim 51, wherein a user orders the customized item cover from a licensee of a delivery system operator, and the licensee produces the customized item cover.

56. The computer-readable medium of claim 55, wherein the licensee communicates with the delivery system operator over a network.

57. The computer-readable medium of claim 51, wherein the personalized delivery payment coding is canceled with a cancellation marking commemorating an event.

58. The computer-readable medium of claim 57, wherein the event comprises at least one of a birthday, a birth, a wedding, a sporting event, an inauguration, a new product promotion, an advertisement, a retirement, and a graduation.

59. The computer-readable medium of claim 51, wherein the delivery payment coding includes a control marking.

60. The computer-readable medium of claim 59, wherein the control marking comprises a serial number.

61. The computer-readable medium of claim 51, wherein the personalized delivery payment coding comprises machine-readable marking.

62. The computer-readable medium of claim 61, wherein the machine-readable marking comprises phosphor.

63. The computer-readable medium of claim 51, wherein the personalized delivery payment coding includes microprinted text within the personalized delivery payment coding.

64. The computer-readable medium of claim 51, wherein the delivery payment coding includes a security thread.

65. The computer-readable medium of claim 51, wherein the customized item cover comprises at least one of an envelope, a card, a package, a United States Postal Service Priority Mail service package, and a United States Postal Service Express Mail service package.

66. The computer-readable medium of claim 51, wherein the customized item cover is produced on stock comprising at least one of a woven fabric, a non-woven fabric, a plastic material, a foil material, and a metal material.

67. The computer-readable medium of claim 51, wherein the customization data comprises at least one of a scanned image, a drawing, text data, and a photograph.

68. The computer-readable medium of claim 51, wherein the customization data comprises at least one of a scanned image, a drawing, text data, and a photograph separate from a delivery payment coding.

69. The computer-readable medium of claim 51, wherein the customized item cover commemorates an event.

70. The computer-readable medium of claim 69, wherein the event comprises at least one of a birthday, a birth, a wedding, a sporting event, an inauguration, a new product promotion, an advertisement, a retirement, and a graduation.

71. The computer-readable medium of claim 51, wherein the first customization segment includes color.

72. The computer-readable medium of claim 51, wherein producing the customized item cover comprises at least one of printing the first customization segment on the customized item cover and embossing the first customization segment on the customized item cover.

73. The computer-readable medium of claim 51, wherein the first and second customization segments are selected from a group consisting of: a customized delivery payment coding, a customized cancellation marking, and a customized area on the item cover different from a delivery payment coding and a cancellation marking.

74. A system for creating on a computer a customized item cover having multiple customization segments, the system comprising:
   means for receiving customization data;
   means for creating a first customization segment using the customization data, the first customization segment associated with a second customization segment on the customized item cover, a portion of the first customization segment printed at a location on the second customization segment wherein at least one of the first and second customization segments includes a personalized delivery payment coding and commemorates an event that comprises at least one of a birthday, a birth, a wedding, a sporting event, an inauguration, a new product promotion, an advertisement, a retirement, and a graduation, and wherein the personalized delivery payment coding comprises at least one of a denomination of delivery payment indicated on the personalized delivery payment coding, a delivery payment rate class indicated on the personalized delivery payment coding, and a bar coding; and means for producing the customized item cover including the first and second customization segments.

75. The system of claim 74, wherein the first and second customization segments are selected from a group consisting of: a customized delivery payment coding, a customized cancellation marking, and a customized area on the item cover different from a delivery payment coding and a cancellation marking.

* * * * *